(12) United States Patent
Woodell et al.

(10) Patent No.: US 7,932,853 B1
(45) Date of Patent: Apr. 26, 2011

(54) SYSTEM AND METHOD FOR IDENTIFYING INCURSION THREAT LEVELS

(75) Inventors: Daniel L. Woodell, Cedar Rapids, IA (US); Patrick D. McCusker, Walker, IA (US); Richard D. Jinkins, Rewey, WI (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 295 days.

(21) Appl. No.: 12/210,061

(22) Filed: Sep. 12, 2008

(51) Int. Cl.
*G01S 13/95* (2006.01)

(52) U.S. Cl. ......... 342/26 B; 342/26 D; 342/29; 342/33; 342/36

(58) Field of Classification Search ............... 342/26 R, 342/26 B, 26 D, 29, 33, 36
See application file for complete search history.

(56) References Cited

U.S. PATENT DOCUMENTS

| | | | |
|---|---|---|---|
| 3,781,878 A | 12/1973 | Kirkpatrick | |
| 3,885,237 A | 5/1975 | Kirkpatrick | |
| 4,259,658 A | 3/1981 | Basov et al. | |
| 4,390,949 A | 6/1983 | Beningfield et al. | |
| 4,399,425 A | 8/1983 | Taylor | |
| 4,460,244 A | 7/1984 | Cole et al. | |
| 4,583,094 A | 4/1986 | Mosier | |
| 4,805,828 A | 2/1989 | Witherell et al. | |
| 4,830,704 A | 5/1989 | Voss et al. | |
| 4,834,320 A | 5/1989 | Tyson | |
| 4,884,077 A | 11/1989 | Landt | |
| 4,921,054 A | 5/1990 | Voss et al. | |
| 4,952,941 A | 8/1990 | Landt | |
| 4,986,495 A | 1/1991 | Stromath et al. | |
| 5,015,083 A | 5/1991 | Wurst et al. | |
| 5,088,662 A | 2/1992 | Appleberry | |
| 5,119,236 A | 6/1992 | Fong et al. | |
| 5,216,611 A | 6/1993 | McElreath | |
| 5,301,510 A | 4/1994 | Glasser | |
| 5,311,097 A | 5/1994 | Mepham et al. | |
| 5,321,406 A * | 6/1994 | Bishop et al. | 342/32 |
| 5,402,965 A | 4/1995 | Cervisi et al. | |
| 5,483,241 A | 1/1996 | Waineo et al. | |
| 5,557,278 A * | 9/1996 | Piccirillo et al. | 342/29 |
| 5,585,813 A | 12/1996 | Howard | |
| 5,644,777 A | 7/1997 | Meyer et al. | |
| 5,661,486 A | 8/1997 | Faivre et al. | |
| 5,748,136 A | 5/1998 | Fischer | |
| 5,936,552 A | 8/1999 | Wichgers et al. | |
| 6,018,698 A | 1/2000 | Nicosia et al. | |

(Continued)

OTHER PUBLICATIONS

Lee, J.A.C.; Munson, D.C., Jr; , "Runway imaging from an approaching aircraft using synthetic aperture radar," Image Processing, 1996. Proceedings., International Conference on , vol. 3, no., pp. 915-918 vol. 3, Sep. 16-19, 1996.*

(Continued)

*Primary Examiner* — John B Sotomayor
(74) *Attorney, Agent, or Firm* — Matthew J. Evans; Daniel M. Barbieri

(57) ABSTRACT

An aircraft weather radar system for displaying an indication of a threat level presented by an obstacle to the aircraft on an electronic display. The weather radar system includes a radar antenna configured to receive radar returns from a radar sweep. The weather radar system additionally includes processing electronics configured to determine a movement vector of the obstacle using the radar returns. The processing electronics are further configured to determine the threat level of the obstacle to the aircraft based on the determined movement vector, to generate parameters for an indication based on the determined threat level and to cause the indication to be displayed on an electronic display.

20 Claims, 11 Drawing Sheets

U.S. PATENT DOCUMENTS

| | | | |
|---|---|---|---|
| 6,085,129 A | 7/2000 | Schardt et al. | |
| 6,107,943 A | 8/2000 | Schroeder | |
| 6,121,899 A | 9/2000 | Theriault | |
| 6,154,151 A | 11/2000 | McElreath et al. | |
| 6,199,008 B1 * | 3/2001 | Aratow et al. | 701/120 |
| 6,204,806 B1 | 3/2001 | Hoech | |
| 6,208,284 B1 | 3/2001 | Woodell et al. | |
| 6,236,351 B1 | 5/2001 | Conner et al. | |
| 6,239,745 B1 | 5/2001 | Stratton | |
| 6,275,773 B1 * | 8/2001 | Lemelson et al. | 701/301 |
| 6,366,836 B1 | 4/2002 | Johnson | |
| 6,388,607 B1 | 5/2002 | Woodell | |
| 6,388,608 B1 | 5/2002 | Woodell et al. | |
| 6,424,288 B1 | 7/2002 | Woodell | |
| 6,492,934 B1 | 12/2002 | Hwang et al. | |
| 6,567,014 B1 | 5/2003 | Hansen et al. | |
| 6,567,728 B1 | 5/2003 | Kelly et al. | |
| 6,571,166 B1 | 5/2003 | Johnson et al. | |
| 6,577,947 B1 * | 6/2003 | Kronfeld et al. | 701/202 |
| 6,591,171 B1 | 7/2003 | Ammar et al. | |
| 6,597,305 B2 | 7/2003 | Szeto et al. | |
| 6,603,425 B1 | 8/2003 | Woodell | |
| 6,606,545 B1 | 8/2003 | McCall et al. | |
| 6,606,563 B2 | 8/2003 | Corcoran, III | |
| 6,690,299 B1 | 2/2004 | Suiter | |
| 6,694,249 B1 | 2/2004 | Anderson et al. | |
| 6,822,617 B1 | 11/2004 | Mather et al. | |
| 6,845,304 B1 | 1/2005 | Young | |
| 6,850,185 B1 | 2/2005 | Woodell | |
| 6,871,124 B1 | 3/2005 | McElreath | |
| 6,876,906 B1 | 4/2005 | Zellers et al. | |
| 6,879,280 B1 | 4/2005 | Bull et al. | |
| 7,081,834 B2 | 7/2006 | Ruokangas et al. | |
| 7,089,092 B1 | 8/2006 | Wood et al. | |
| 7,109,912 B1 | 9/2006 | Paramore et al. | |
| 7,109,913 B1 | 9/2006 | Paramore et al. | |
| 7,138,619 B1 | 11/2006 | Ferrante et al. | |
| 7,148,816 B1 | 12/2006 | Carrico | |
| 7,196,329 B1 | 3/2007 | Wood et al. | |
| 7,212,920 B1 | 5/2007 | Bailey et al. | |
| 7,219,011 B1 | 5/2007 | Barber | |
| 7,292,178 B1 | 11/2007 | Woodell et al. | |
| 7,486,220 B1 * | 2/2009 | Kronfeld et al. | 342/26 B |
| 7,589,644 B2 * | 9/2009 | Meunier | 340/945 |
| 7,664,601 B2 * | 2/2010 | Daly, Jr. | 702/3 |
| 7,714,767 B1 * | 5/2010 | Kronfeld et al. | 342/26 B |
| 7,808,422 B1 * | 10/2010 | Woodell et al. | 342/26 B |
| 7,834,779 B2 * | 11/2010 | He et al. | 340/973 |
| 7,843,380 B1 * | 11/2010 | Woodell | 342/120 |
| 2002/0089432 A1 | 7/2002 | Staggs et al. | |
| 2002/0147544 A1 | 10/2002 | Nicosia et al. | |
| 2002/0163461 A1 | 11/2002 | Smithey | |
| 2003/0016156 A1 | 1/2003 | Szeto et al. | |
| 2003/0156734 A1 * | 8/2003 | Wolfson et al. | 382/100 |
| 2003/0225487 A1 | 12/2003 | Robert et al. | |
| 2003/0227395 A1 | 12/2003 | Zeineh | |
| 2004/0239550 A1 * | 12/2004 | Daly, Jr. | 342/26 B |
| 2006/0074559 A1 * | 4/2006 | Meunier | 701/301 |
| 2006/0227012 A1 * | 10/2006 | He | 340/945 |
| 2009/0207048 A1 * | 8/2009 | He et al. | 340/973 |

OTHER PUBLICATIONS

Kwag, Y.K.; Kang, J.W.; "Obstacle awareness and collision avoidance radar sensor system for low-altitude flying smart UAV," Digital Avionics Systems Conference, 2004. DASC 04. The 23rd, vol. 2, no., pp. 12.D.2-121-10 vol. 2, Oct. 24-28, 2004.*

Cassell, R., "Development of the Runway Incursion Advisory and Alerting System (RIAAS)," NASA/CR 2005-213759, Rannoch Corporation, May 2005, 30 pages.

Cassell, R. et al., "NASA Runway Incursion Prevention System (RIPS) Dallas-Fort Worth Demonstration Performance Analysis," NASA/CR 2002-211677, Rannoch Corporation, Jun. 2002, 119 pages.

Green, David F., "Runway Safety Monitor Algorithm for Runway Incursion Detection and Alerting," NASA/CR 2002-211416, Lockheed Martin Corporation, Jan. 2002, 43 pages.

Jones, Denise R., "Runway Incursion Prevention System Simulation Evaluation," presented at 21st Digital Avionics Conference, Irvine, CA, Oct. 27-31, 2002, 12 pages.

McGrath, John K., Technical Standard Order, TSO-C115b, Airborne Area Navigation Equipment Using Multi-Sensor Inputs, Department of Transportation, Federal Aviation Administration, Sep. 30, 1994, 11 pages.

"Runway Safety Program," FAA Order 7050.1, U.S. Department of Transportation, Nov. 2002, 21 pages.

Young, S.D. et al., "Runway Incursion Prevention: A Technology Solution," presented at the Joint Meeting of the Flight Safety Foundation's 54th Annual International Air Safety Seminar, the International Federation of Airworthiness' 31st International Conference, and the International Air Transport Association, Athens, Greece, Nov. 5-8, 2001, cover page and pp. 221-237.

Zipser, Edward J. et al., "The Vertical Profile of Radar Reflectivity of Convective Cells: A Strong Indicator of Storm Intensity and Lightning Probability?," Dept. of Meteorology, Texas A&M University, College Station, Texas, American Meteorological Society, Aug. 1994, vol. 122, pp. 1751-1759.

* cited by examiner

SYSTEM AND METHOD FOR IDENTIFYING INCURSION THREAT LEVELS

BACKGROUND

The present disclosure relates generally to the field of an aircraft weather radar system for an incursion prevention system. The disclosure also relates to an aircraft weather radar system for displaying an indication of a threat level presented by an obstacle to the aircraft.

Incursion prevention systems are used to assess threats to an aircraft. Incursion prevention systems can have their performance characterized by their detection rates and false alarm rates. In traditional incursion prevention systems, an object's intent is not factored in to threat analysis. As a result, excessive false alarms are produced.

Furthermore, traditional incursion prevention systems do not operate independently. Traditional incursion prevention systems rely on ground infrastructure or for future fleets to be equipped with ADS-B systems.

Therefore, there is a need for an incursion prevention system with reduced false alarm rates. There is also a need for an incursion prevention system that can function independently without relying on a ground infrastructure or ADS-B systems.

SUMMARY

One embodiment of the disclosure relates to an aircraft weather radar system for displaying an indication of a threat level presented by an obstacle to the aircraft on an electronic display. The weather radar system includes a radar antenna and processing electronics. The radar antenna is configured to receive radar returns from a radar sweep. The processing electronics are configured to determine a movement vector (e.g., including position, speed or velocity, and acceleration data) of the obstacle using the radar returns and to determine a threat level of the obstacle to the aircraft based on the determined movement vector. The processing electronics are also configured to use the determined threat level to generate parameters for an indication, and to cause the indication to be displayed on an electronic display.

Another embodiment of the disclosure relates to a method for displaying an indication of a threat level presented by an obstacle to an aircraft on an electronic display. The method includes receiving radar returns from a radar sweep by a weather radar system, determining a movement vector of the obstacle using the radar returns, determining the threat level of the obstacle to the aircraft based on the determined movement vector, using the determined threat level to generate parameters for the indication, and causing the indication to be displayed on the electronic display.

A further embodiment of the disclosure relates to an apparatus for displaying an indication of a threat level presented by an obstacle to an aircraft on an electronic display. The apparatus includes means for receiving radar returns from a radar sweep by a weather radar system, means for determining a movement vector of the obstacle using the radar returns, means for determining the threat level of the obstacle to the aircraft based on the determined movement vector, means for using the determined threat level to generate parameters for the indication, and means for causing the indication to be displayed on the electronic display.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Figure 1:
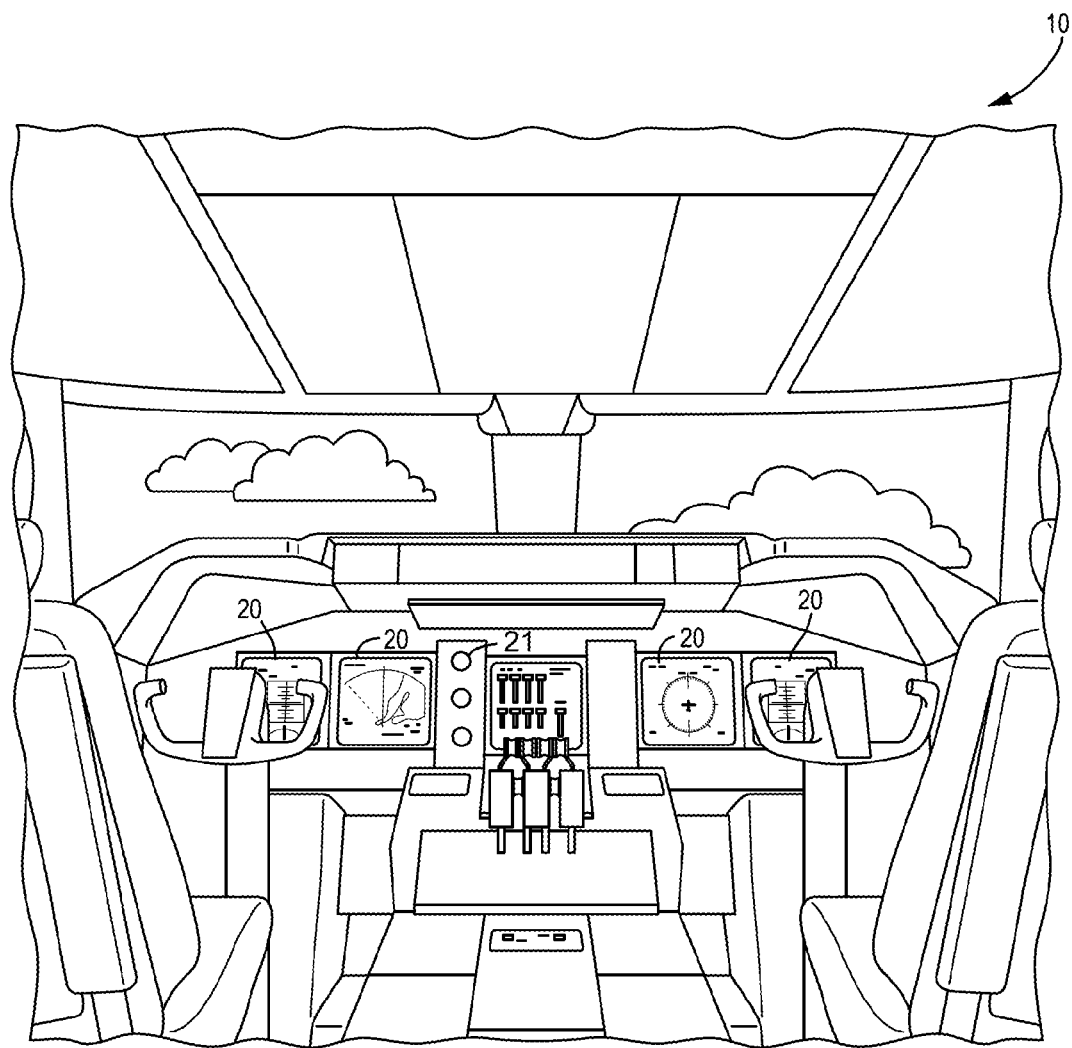
FIG. 1 is an illustration of an aircraft control center or cockpit, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20 which are used to increase visual range and to enhance decision-making abilities. In an exemplary embodiment, flight displays 20 can provide an output from a radar system of the aircraft. Furthermore, flight displays 20 can provide an output from an incursion prevention system.

Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Figure 2:
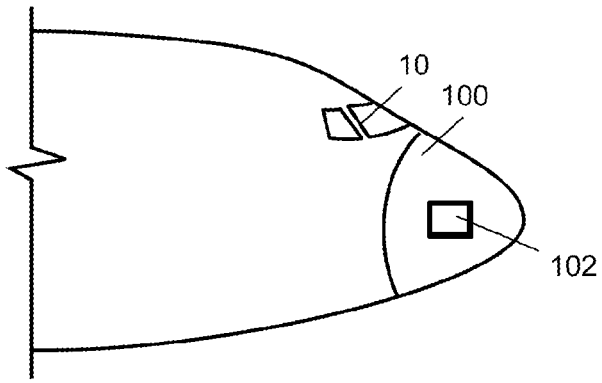
FIG. 2 shows the front of an aircraft with an aircraft control center and nose, according to an exemplary embodiment.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft.

Figure 3A:
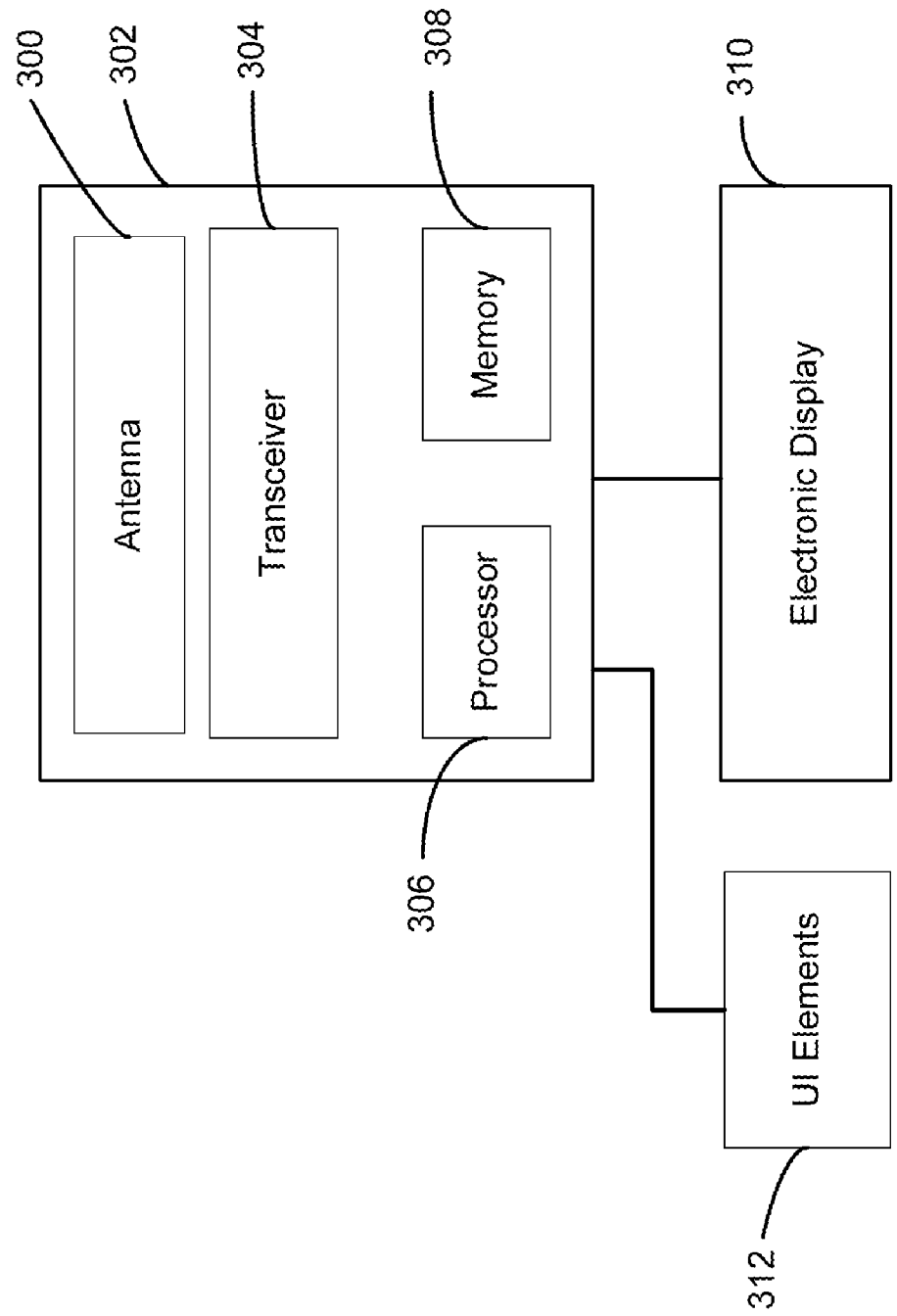
FIG. 3A is a block diagram of an antenna system for a weather radar system, according to an exemplary embodiment.

Referring to FIG. 3A, a radar system 302 is shown in greater detail, according to an exemplary embodiment. Radar system 302 includes an antenna 300, transceiver 304, processor 306, and memory 308. Antenna 300 may receive radar returns from a target.

Referring to FIG. 3A, radar system 302 can include a receive circuit or other circuit configured to receive data from the antenna 300 and to provide the data to processor 306. Radar system 302 can also include a transceiver 304 for transmitting and receiving signals via the antenna 300. According to various exemplary embodiments, processor 306 can be any hardware and/or software processor or processing architecture capable of executing instructions and operating on data related to the radar returns.

Radar system 302 may include a processor 306 or other circuitry for determining the intent or future state (e.g., taking off, landing, taxiing, etc.) of an obstacle and/or ownship based on radar returns received by antenna 300. Processor 306 can identify targets based on radar signals received through transceiver 304 and from antenna 300. The intent of the obstacle can be determined from a movement vector. The movement vector determined by processor 306 for the identified targets includes data on position and closing velocity (a velocity vector) and acceleration of the obstacle relative to the aircraft. The movement vector can also or instead include data regarding absolute position, direction and speed (a velocity vector) and/or acceleration of the obstacle. Processor 306 can determine whether an obstacle is stationary, taxiing, taking off, or landing based on the movement vector. Processor 306 can estimate the velocity of the identified targets and match the identified targets with targets found in previous radar sweeps. By matching the velocity vector of a target with previous sweeps, processor 306 can determine an acceleration of the target for the movement vector.

Processor 306 can additionally determine a threat level of the obstacle to an aircraft based on the intent or determined movement vector and acceleration. For example, the intent of an aircraft can be determined by checking if the direction of the aircraft may intersect with that of an ownship or is moving towards an ownship and whether the acceleration and velocity is such that a threat is posed to the ownship. Furthermore, processor 306 can display an indicator on an electronic display 310. Additionally, processor 306 can generate parameters for the indicator based on the determined threat level. Processor 306 may also store information in memory 308 to be retrieved for later use. Memory 308 may be any volatile or non volatile memory.

Electronic display 310 can be any display capable of displaying an output from a radar system of an aircraft. Electronic display 310 can be any of a variety of displays, including but not limited to CRT, LCD, organic LED, and/or a HUD system with a projector.

Furthermore, radar system 302 can be coupled to user interface (UI) elements 312. Radar system 302 can receive user inputs from UI elements 312. UI elements 312 can include dials, switches, buttons, touch screens, or any other user input device. UI elements 312 can be used to adjust features of flight displays 20, such as contrast, brightness, width, and length. UI elements 312 can also (or alternatively) be used by an occupant to interface with or change the displays of flight displays 20. UI elements 312 can additionally be used to adjust information shown on flight displays 20.

Figure 3B:
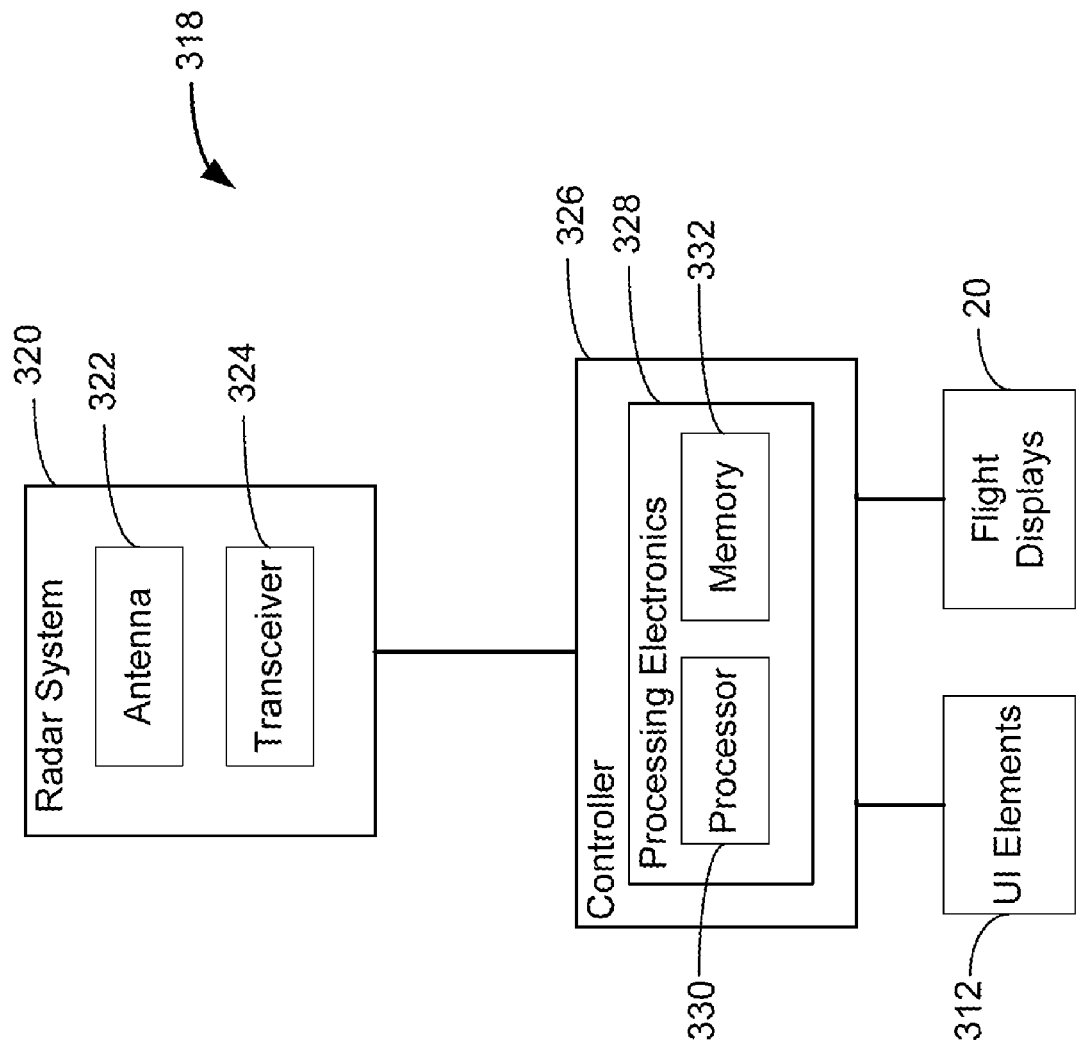
FIG. 3B is a block diagram of an antenna system for a weather radar system, according to a further exemplary embodiment

Referring to FIG. 3B, a weather radar system 318 is shown, according to a further exemplary embodiment. Weather radar system 318 includes radar system 320, controller 326, UI elements 312, and flight displays 20.

Radar system 320 can be any system configured to transmit and receive data related to radar returns. Radar system 320 includes an antenna 322 and transceiver 324. Transceiver 324 can be used to transmit and receive signals via the antenna 322. Antenna 322 can be used to transmit radar beams and to receive radar returns from a target.

Further, radar system 320 is configured to communicate radar returns to controller 326. Controller 326 includes processing electronics 328. Further, controller 326 can output data related to radar returns to flight displays 20. Additionally, controller 326 can receive user inputs via UI elements 312.

Processing electronics 328 can be configured to execute instructions and operate on data related to radar returns received from radar system 320. Additionally, processing electronics 328 include processor 330 and memory 332. Processor 330 can be any hardware and/or software configuration capable of executing instructions and operating on data related to radar returns. Processor 330 can also store data in memory 332. Further, memory 332 can be any volatile or non volatile memory.

Figure 3C:
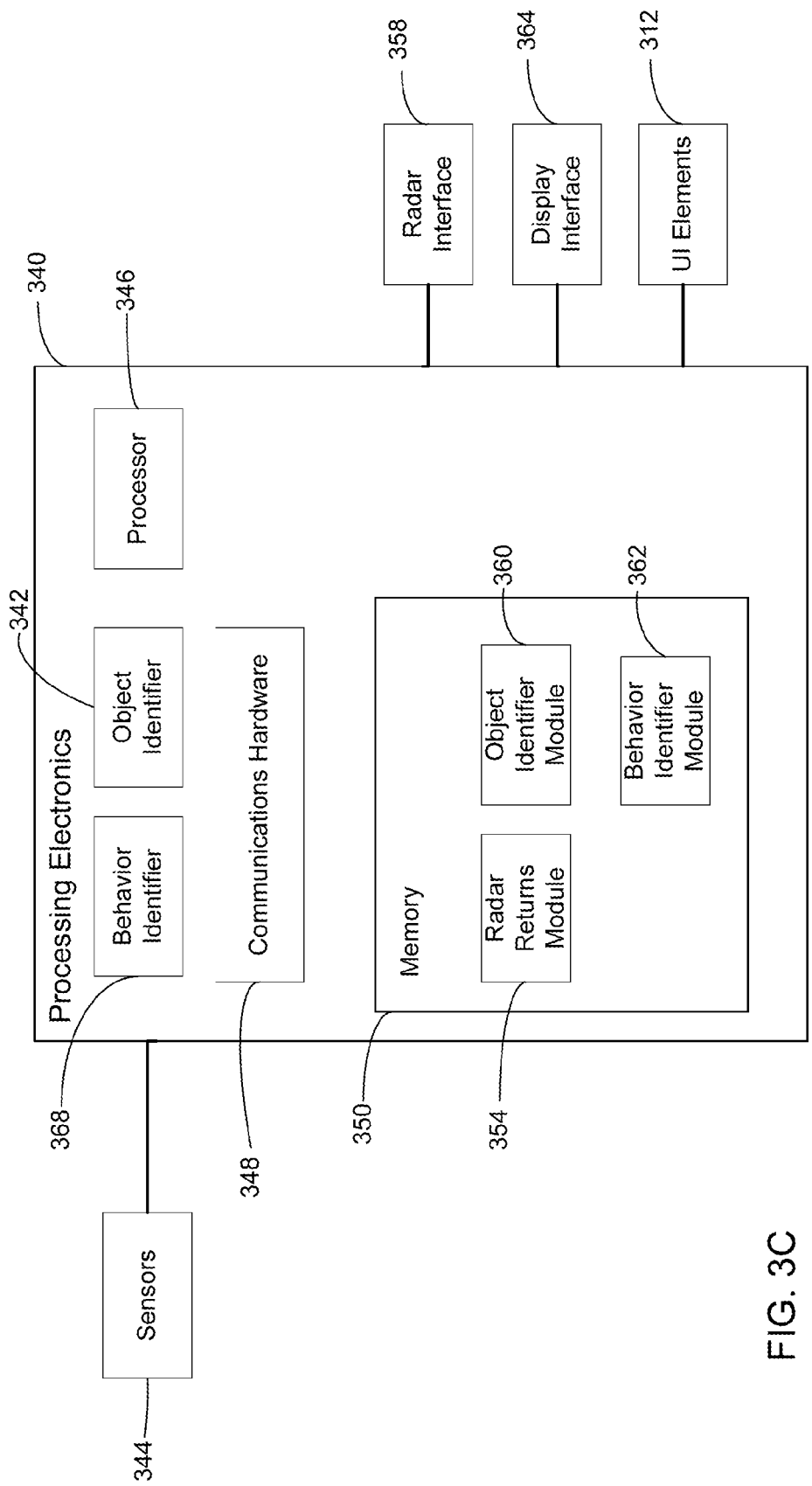
FIG. 3C is a block diagram of an antenna system for a weather radar system, according to an exemplary embodiment

Referring to FIG. 3C, processing electronics 340 are shown in greater detail, according to an exemplary embodiment. Processing electronics 340 can be representative of the processing electronics of FIGS. 3A and 3B.

Processing electronics 340 can object identifier 342, processor 346, communications hardware 348, behavior identifier 368, and memory 350. Further, radar system 340 can be configured to receive inputs from sensors 344, radar interface 358, display interface 364, and/or UI elements 312.

Processor 346 can be capable of operating on data related to radar returns. Further, processor 346 can execute instructions based on input received from sensors 344, radar interface 358, display interface 364, and/or UI elements 312.

Communications hardware 348 can be any hardware used for communication between processing electronics 340 and other external components. For example, communications hardware 348 can be an Ethernet port, USB port, coaxial cable, etc. for communication data from an antenna (e.g. antenna 302 and/or antenna 322) to processing electronics 340. Further, communications hardware 348 can be used to communicate data from components other than an antenna. For example, communications hardware 348 can be used to communicate data from flight displays 20, radar interface 358, display interface 364, UI elements 312, sensors 344, or any other source of data.

Object identifier 342 can be any hardware or software configuration for identifying objects via a radar. Object identifier 342 can identify objects including but not limited to other aircraft, ground vehicles, airport structures, etc. Objects identified by object identifier 342 can be objects both on the ground and/or in the air.

Behavior identifier 368 can be any hardware or software configuration for identifying behavior characteristics of objects identified by object identifier 342. For example, behavior identifier 368 can determine speed and acceleration of a ground target identified by object identifier 342. Based on the speed and acceleration, behavior identifier can determine the intent or a future state of the ground target, for example whether the target is taking off, landing, taxiing, stationary, etc. If the acceleration is greater than a predetermined value (e.g., greater than about 0.05 g, greater than about 0.07 g, greater than about 0.10 g, etc.) the target may be taking off. If the acceleration has a negative value or is deceleration, the target may be landing. If the acceleration is low (e.g., between about 0 and 0.10 g, between about 0 and 0.07 g, between about 0 and 0.05 g, etc.), the target may be taxiing. If the speed is zero, the target is stationary.

Sensors 344 can be any type of sensor used to determine various information. Sensors 344 could be used to determine information related to navigation, weather, etc.

Memory 350 can be used to store various information relating to radar returns. Memory 350 can include a radar returns module 354, behavior identifier module 362, and object identifier module 362. Further, memory 350 can be any volatile or non volatile memory.

Radar returns module 354 can data received from radar sweeps. For example, radar returns module 354 can store data from the most recent radar sweep or previous radar sweeps for use by other components of processing electronics 340.

Object identifier module 360 can be used to store information relating to identified objects. For example, object identifier module 360 can store information regarding whether an object is identified as an aircraft, ground vehicle, ground structure, etc. The stored object or target can be matched with objects identified by current or future radar sweeps.

Behavior identifier module 362 can store information relating to behavior characteristics. For example, behavior identifier module 362 can store speed and velocity data of objects identified by object identifier 342 or data determined by behavior identifier 368. The stored speed and velocity of the identified objects can be compared with current or future radar sweeps to determine acceleration for the movement vector.

Radar interface 358 can include buttons, switches, levers, touch screens, etc. that a user can interface with. Radar interface 358 can be used to change various aspects of the radar system. For example, radar interface 358 may be used to move the location of a radar sweep, change the size of a radar sweep, etc.

Display interface 364 can include buttons, switches, levers, touch screens, etc. that a user can interface with. Display interface 364 can be used to change various aspects of the display systems. For example, display interface 364 can be used to adjust the height, width, brightness, contrast, etc. of the display systems.

Figure 3D:
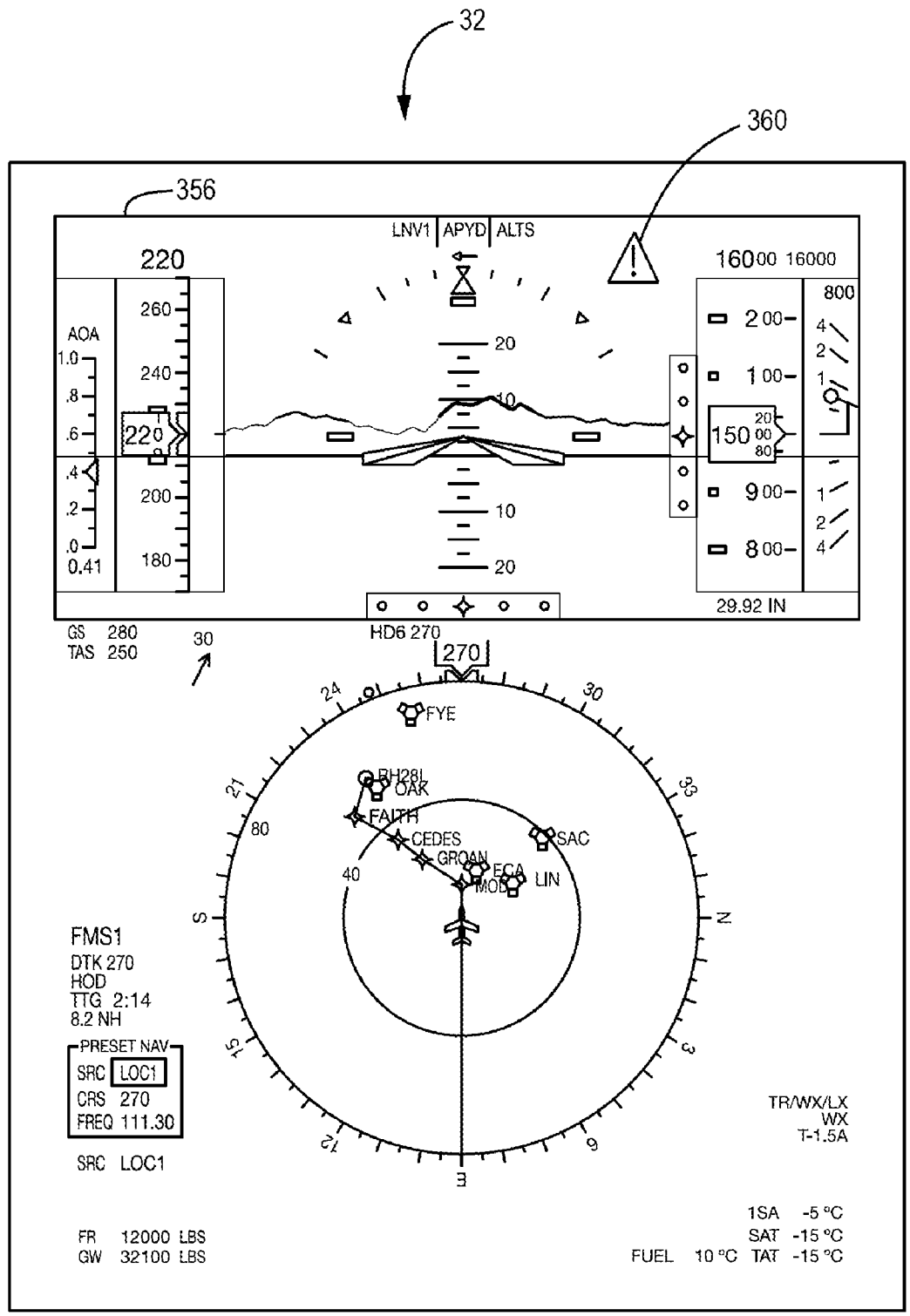
FIG. 3D is an illustration of an electronic display screen, according to an exemplary embodiment.

Referring to FIG. 3D, an electronic display 32 is shown, according to an exemplary embodiment. Electronic display 32 can include a three-dimensional perspective image 356. Three-dimensional perspective image 356 can also be a weather radar map, terrain display, and/or a weather display. Electronic display 32 may be configured to receive a signal from processing electronics (e.g. processor 306, processing electronics 328, processing electronics 340) to provide an indicator 360. Indicator 360 can be indicative of an obstacle or other threat to the aircraft. Indicator 360 can be an icon, text, string, symbol, synthetic image, LED indicator, audible tone, or any other visible and/or audible alarm. Indicator 360 can be configured to flash, enlarge, change colors, display text, emit an audible alarm or any combination thereof based upon the determined threat level. Indicator 360 can additionally be configured to cause electronic display 32 to flash, enlarge, turn red, display text, emit an audible alarm or any combination thereof.

Figure 4:
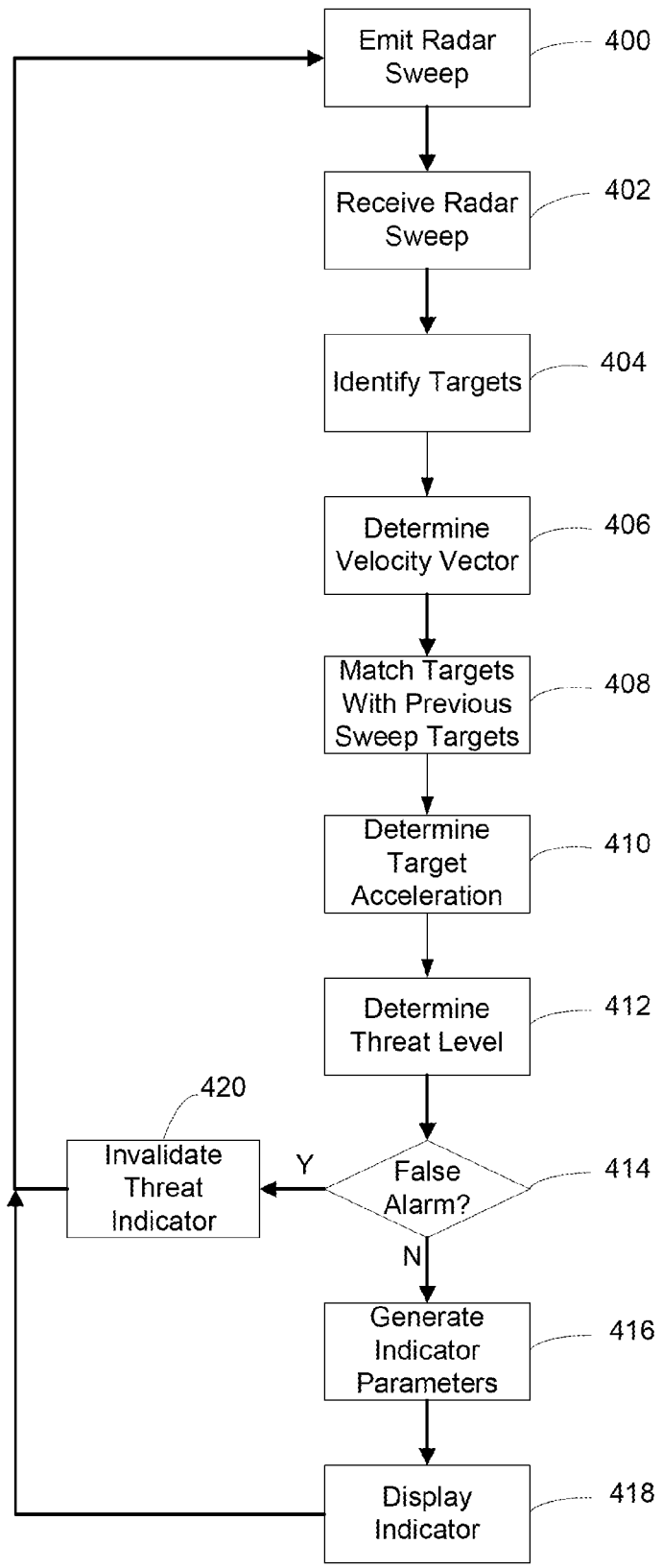
FIG. 4 is a process flow diagram of a method for displaying an indication of a threat level presented by an obstacle to an aircraft, according to an exemplary embodiment.

Shown in FIG. 4, a process flow diagram of a method for displaying an indication of a threat level presented by an obstacle to an aircraft is shown, according to an exemplary embodiment. An obstacle to the aircraft can include any of an aircraft, a ground vehicle, and an airport structure identified by object identifier 342. The method begins by emitting a radar sweep (step 400) and waiting to receive a return radar sweep (step 402) from the previous step. The radar used in step 400 may be any weather radar system capable of functioning independently of ground infrastructure and/or ADS-B systems, for example radar system 302 or radar system 320. Upon receiving a radar return in step 402, the processing electronics (e.g. processor 306, processing electronics 328, and/or processing electronics 340) can identify targets found by the radar sweep (step 404) and use the received data to determine a velocity vector (step 406) of an object. The processing electronics compares the determined velocity vector (step 406) with previous sweep targets (step 408) and their respective movement vectors to determine a target acceleration (step 410) and movement vector including the target acceleration. Use the determined movement vector (the velocity vector from step 406 and the determined target acceleration from step 410), the processing electronics can determine an intent and threat level (step 412) of the object to the aircraft, as well as whether or not the object is predicted to incur with the aircraft.

The processing electronics determine the intent and threat level based upon whether or not the obstacle is predicted to incur with the aircraft based on the movement vector (e.g., heading, bearing, speed, etc.) and acceleration of the target. The incursion may take place on or off a runway. The threat level can be any of a low, medium, or high threat level. A low threat level represents an object within the proximity of the aircraft without a predicted incursion. A medium threat level represents a possible incursion but not immediately or directly affecting the aircraft. A high threat level represents a predicted or actual incursion having a direct or immediate affect on the aircraft.

Based on the determined threat level of step 412, the processing electronics can determine whether or not an alarm is false (step 414). For example, when the movement vector determined in step 406 indicates a stationary object or an object with an intent that does not affect the ownship, the processing electronics may determine that the object poses an insignificant threat or lower threat to the aircraft in step 412. As a result, the processing electronics may detect a false alarm in step 414. When a false alarm is detected, the associated threat indicator can be invalidated and removed (step 420) or lowered appropriately by the processing electronics. After a threat is invalidated or lowered in step 420, the method can return to step 400 and repeat.

When a false alarm is not detected, the processing electronics can generate indicator parameters (step 416) based on the determined threat level from step 406. The processing electronics can then output a signal to the displays (e.g. flight displays 20, electronic display 32, and/or electronic display 310) to show the appropriate indicator (step 418). For example, a high threat indicator may include a more visible warning in addition to an audible warning. A low threat indicator may include a smaller, less visible warning without an audible warning. After the indicator is displayed in step 418, the method can return to step 400 and repeat.

Figure 5:
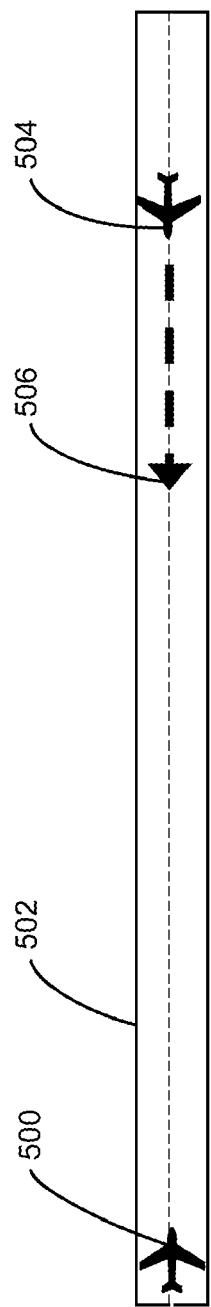
FIG. 5 is an illustration of a runway incursion scenario, according to an exemplary embodiment.

Referring to FIG. 5, a runway incursion scenario is shown, according to an exemplary embodiment. A runway 502 is shown with ownship 500, obstacle 504, and movement vector 506. Ownship 500 is shown in a stationary holding position. Obstacle 504 is shown moving towards ownship 500 as indicated by movement vector 506.

In the aforementioned scenario, if movement vector 506 indicates a low speed and low acceleration, the processing electronics (e.g. processor 306, processing electronics 328, and/or processing electronics 340) can estimate/determine that obstacle 504 is in a taxi mode. Therefore, the processing electronics can determine based on the intent that the probability of a collision is reduced. As a result, the method can provide a low threat level warning.

If movement vector 506 indicates a high speed and/or high acceleration, then the processing electronics can estimate/determine that obstacle 504 is accelerating with the intent of taking-off. Therefore, the processing electronics can determine that the probability of a collision is high. As a result, a high threat level warning may be generated by the system.

Figure 6:
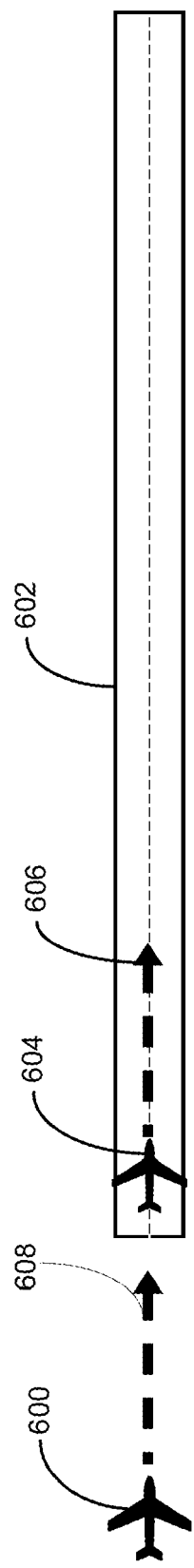
FIG. 6 is an illustration of a further runway incursion scenario, according to another exemplary embodiment.

Referring to FIG. 6, a runway incursion scenario is shown, according to another exemplary embodiment. A runway 602 is shown with ownship 600, obstacle 604, ownship movement vector 608, and obstacle movement vector 606. Ownship 600 is shown approaching runway 602 on a final landing approach, as indicated by ownship movement vector 608. Obstacle 604 is shown on runway 602 with obstacle movement vector 606.

In the aforementioned scenario, if obstacle movement vector 606 indicates no velocity and acceleration, then the processing electronics can estimate/determine that obstacle 604 is stationary. Therefore, the processing electronics can determine based on the stationary intent that a collision event between ownship 600 and obstacle 604 is very likely. As a result, a high threat level warning will be generated by the system.

If obstacle movement vector 606 indicates low velocity and low acceleration, then the processing electronics can estimate/determine that obstacle 604 is likely to be on the runway as ownship 600 lands. Therefore, the processing electronics can determine based on the intent of obstacle 604 that a collision event between ownship 600 and obstacle 604 is likely. As a result, a medium threat level warning can be generated by the system.

If obstacle movement vector 606 indicates high velocity and high acceleration, then the processing electronics can estimate/determine that obstacle 604 is likely to takeoff or leave the runway before becoming an issue to ownship 600. Therefore, the processing electronics can determine that a collision event between ownship 600 and obstacle 604 is unlikely. As a result, a situational annunciation or low threat level warning can be generated by the system.

While the illustrated scenario case does not have the obstacle 604, for example an aircraft, moving on the runway, standard practice may allow an aircraft to begin landing while another aircraft is taking off and clearing the runway. If obstacle 604 is beginning its takeoff, ownship 600 may be safe to land with the assumption obstacle 604 will be gone. Such a scenario may generate a false alarm that the system can reject.

Figure 7:
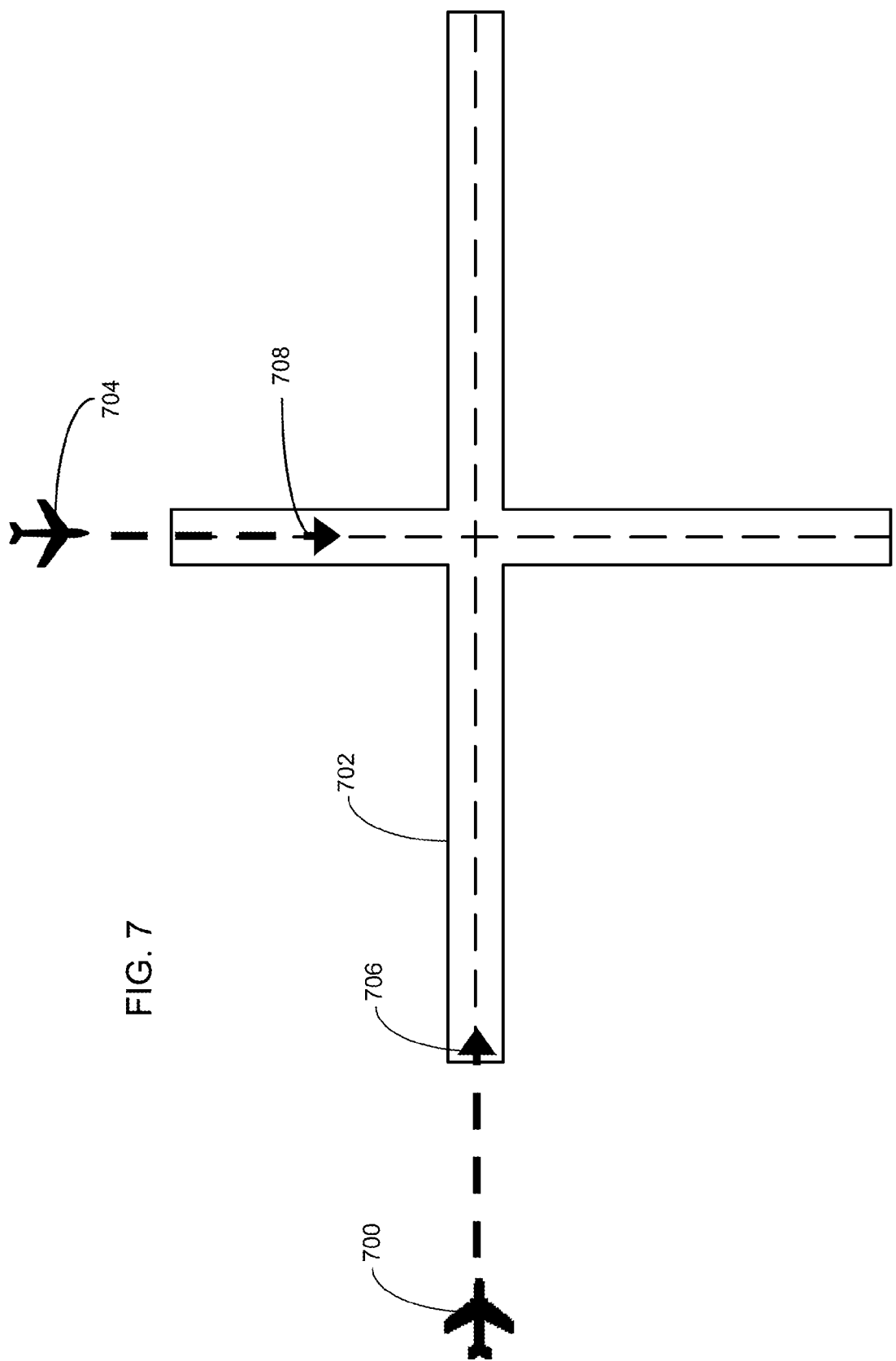
FIG. 7 is an illustration of a dual runway incursion scenario, according to another exemplary embodiment.

Referring to FIG. 7 a dual runway incursion scenario is shown, according to another exemplary embodiment. Runway 702 is shown with ownship 700 preparing to land. Additionally, obstacle 704 is present or predicted to be present on runway 702, with object movement vector 708.

In the aforementioned scenario, if obstacle movement vector 708 indicates no velocity and no acceleration, then the processing electronics can estimate/determine that obstacle 704 is stationary. Therefore, the processing electronics can determine that obstacle 704 will not come into contact with ownship 700 during landing. As a result, a situational annunciation or low threat level warning may be generated by the system.

If obstacle movement vector 708 indicates low velocity and low acceleration, then the processing electronics can estimate/determine that obstacle 704 is taxiing. Therefore, the processing electronics can determine that obstacle 704 is unlikely to come into contact with ownship 700 during landing. As a result, a medium threat level warning may be generated by the system.

If obstacle movement vector 708 indicates high velocity and high acceleration, then obstacle 704 can be determined to be accelerating to take off by the processing electronics. Therefore, the processing electronics can determine that obstacle 704 is likely to come into contact with ownship 700 during landing. As a result, a high threat level warning may be generated by the system.

Figure 8:
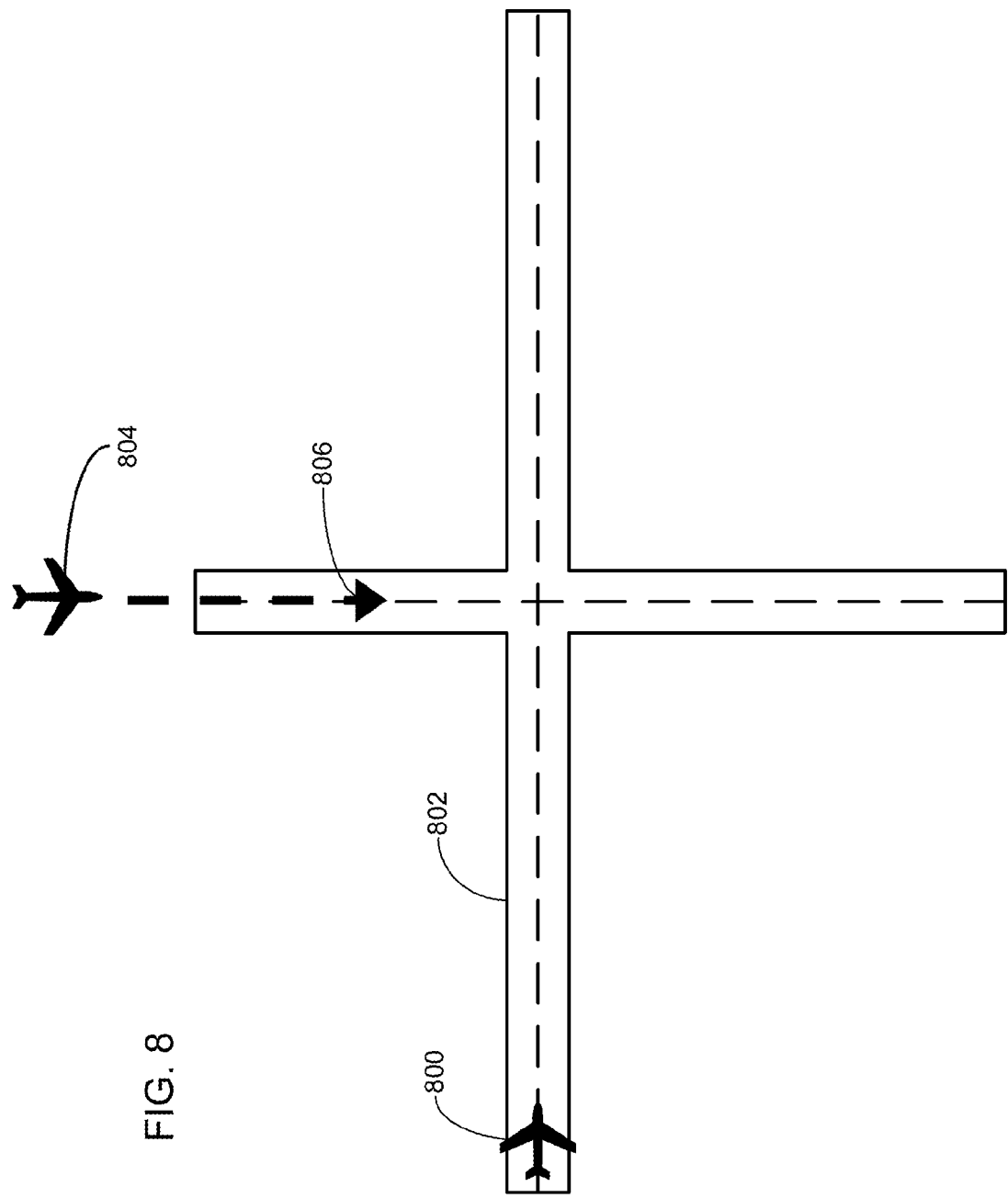
FIG. 8 is an illustration of a further dual runway incursion scenario, according to another exemplary embodiment.

Referring to FIG. 8 a further dual runway incursion scenario is shown, according to another exemplary embodiment. Runway 802 is shown with ownship 800 stationary but preparing to takeoff. Obstacle 804 is shown moving towards ownship 800 as indicated by movement vector 806.

In the aforementioned scenario, if movement vector 806 indicates a low velocity and low acceleration, then obstacle 804 can be determined to be taxiing by the processing electronics. Therefore, the processing electronics can determine that a collision event between ownship 800 and obstacle 804 is unlikely. As a result, a low threat level warning or situational annunciation may be generated by the system.

If movement vector 806 indicates a high velocity and high acceleration, then the processing electronics can estimate/determine that obstacle 804 is accelerating to take-off thrust. Therefore, the processing electronics can determine that a collision event between ownship 800 and obstacle 804 is likely. As a result, a high threat level warning may be generated by the system.

Figure 9:
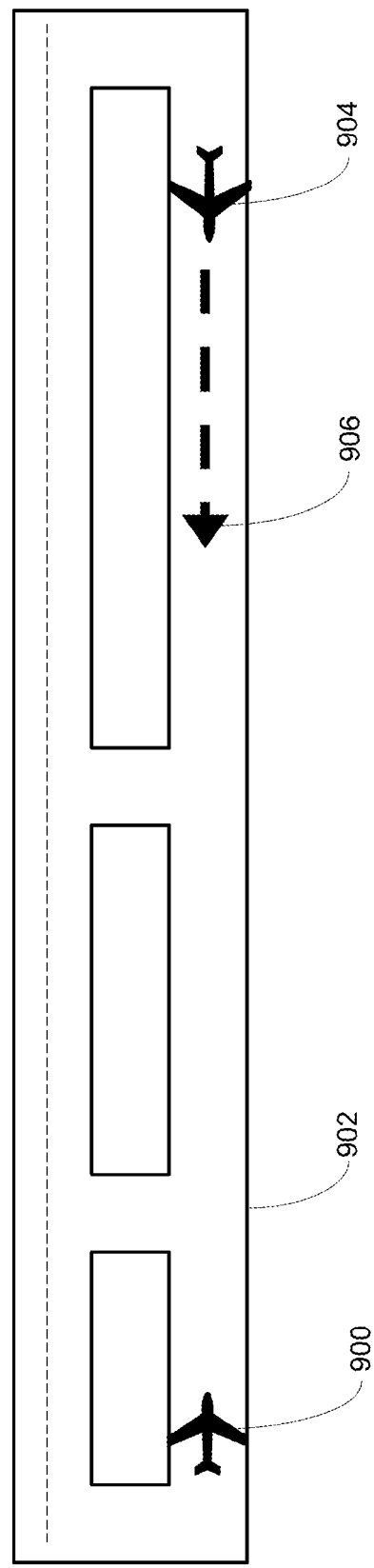
FIG. 9 is an illustration of a taxi-way incursion scenario, according to another exemplary embodiment.

Referring to FIG. 9 a taxi-way incursion scenario is shown, according to another exemplary embodiment. Taxi-way 902 is shown with ownship 900 performing normal taxi operations. Object 904 is shown moving along taxi-way 902 as indicated by movement vector 906.

In the aforementioned embodiment, if movement vector 906 indicates a low velocity and low acceleration, then the processing electronics can estimate/determine that obstacle 904 is taxiing. As a result, the processing electronics can determine that obstacle 904 is unlikely to collide with ownship 900. Therefore, a low threat level warning or situational annunciation may be generated by the system.

If movement vector 906 indicates a high velocity and high acceleration, then obstacle 904 can be determined to be accelerating to take-off thrust by the processing electronics. As a result, the processing electronics can determine that obstacle 904 is likely to collide with ownship 900. Therefore, a high threat level warning may be generated by the system.

For example, if aircraft 900 recognizes the acceleration of aircraft 904 as greater than a predetermined value (e.g., 0.07 g), it means aircraft 904 may be accelerating to takeoff speed. In view of the current speed vector and the estimated acceleration determined from a recent radar sweep, aircraft 904 may not appear to the processing electronics or on the display like a threat. But as the aircraft's engines ramp up in power, the next time the radar sweeps across the aircraft the acceleration may be in the 0.25 to 0.5 g range. The aircraft velocity/acceleration shown the previous aircraft state did not represent a hazard, however an impending collision may now be present. The acceleration estimation allows for an estimation of the intent of aircraft 904 (e.g., aircraft 904 is going to take off). Velocity/acceleration/range allow the processing electronics to warn on a potential collision using knowledge of the intent of aircraft 904, for example if aircraft 904 is simply taxiing (e.g., back taxing on an active runway) or is taking off.

Figure 10:
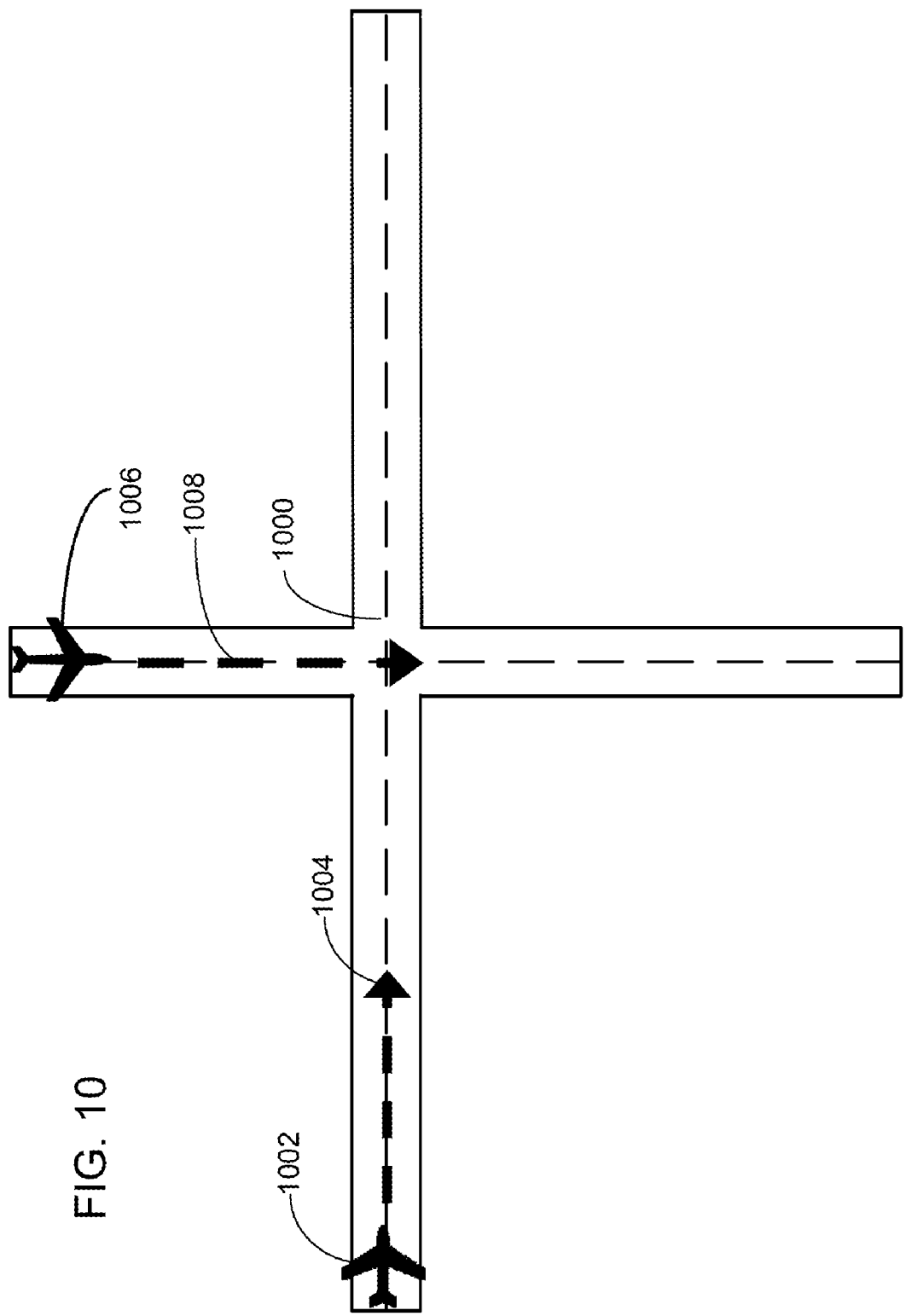
FIG. 10 is an illustration of a further dual runway incursion scenario, according to another exemplary embodiment.

Referring to FIG. 10, a runway incursion scenario is shown, according to another exemplary embodiment. A runway 1000 is shown with ownship 1002, movement vector 1004 of ownship 1002, obstacle 1006, and movement vector 1008 of obstacle 1006. Ownship 1002 is positioned at one end of runway 1000 and been given permission to take-off as indicated by movement vector 1004. Obstacle 1006 is positioned at one end of an intersecting portion of runway 1000 (e.g., diagonal from ownship 1002) and been given permission to take-off as indicated by movement vector 1008.

In the aforementioned scenario, if movement vector 1008 indicates a low speed and low acceleration, the processing electronics (e.g. processor 306, processing electronics 328, and/or processing electronics 340) can estimate/determine that obstacle 1006 is determined to be in taxi mode. Therefore, the processing electronics can determine that the probability of a collision is reduced. As a result, the method can provide a low threat level warning.

If movement vector 1008 indicates a high speed and/or high acceleration, then the processing electronics can estimate/determine that obstacle 1006 is accelerating to a take-off thrust. Therefore, the processing electronics can determine that the probability of a collision is high as ownship 1002 has also been cleared for take-off. As a result, a high threat level warning may be generated by the system.

It should be appreciated that the aforementioned examples and scenarios are given by way of example only. The disclosed method is not limited to the specific scenarios and locations of the exemplary embodiments. For example, the method can be used during flight in addition to during taxi and take-off. Additionally, the method can be used to determine threat levels of a multitude of objects simultaneously.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system for use on an aircraft and for displaying an indication of a threat level presented by an obstacle to the aircraft on an electronic display, the weather radar system having a radar antenna configured to receive radar returns from a radar sweep, comprising:
    processing electronics configured to determine a movement vector of the obstacle using the radar returns, the processing electronics further configured to determine the threat level of the obstacle to the aircraft based at least in part on acceleration of the obstacle determined from the movement vector, the processing electronics further configured to use the threat level to generate the indication, the processing electronics further configured to cause the indication to be displayed on the electronic display.

2. The aircraft weather radar system of claim 1, wherein the threat level is used to confirm or invalidate a previously existing threat level indication.

3. The aircraft weather radar system of claim 1, wherein the movement vector comprises position, and closing velocity of the obstacle relative to the aircraft.

4. The aircraft weather radar system of claim 1, wherein the movement vector comprises absolute position, direction, and speed data of the obstacle.

5. The aircraft weather radar system of claim 4, wherein the acceleration is calculated from present and previous velocity data.

6. The aircraft weather radar system of claim 1, wherein the obstacle is at least one of another aircraft, a ground vehicle, or an airport structure.

7. The aircraft weather radar system of claim 5, wherein the movement vector is used to determine whether the obstacle is stationary, taxiing, taking off, or landing.

8. The aircraft weather radar system of claim 1, wherein determining the threat level of the obstacle to the aircraft comprises determining whether or not the obstacle is predicted to or does incur with the aircraft on a runway.

9. The aircraft weather radar system of claim 1, wherein the threat level represents at least one of a low threat level, a medium threat level, and a high threat level, the processing electronics being configured to change the indication based on the low, medium, or high threat level.

10. The aircraft weather radar system of claim 9, wherein the low threat level represents proximity but not predicted incursion, the medium threat level represents possible incursion but not immediately or directly affecting the aircraft, and the high threat level represents a predicted or actual incursion having a direct or immediate affect on the aircraft.

11. A method for displaying an indication of a threat level presented by an obstacle to an aircraft on an electronic display, comprising:
    receiving radar returns from a radar sweep by a weather radar system;
    determining a movement vector of the obstacle using the radar returns;
    determining the threat level of the obstacle to the aircraft based at least in part on acceleration of the obstacle determined from the movement vector;
    using the threat level to generate the indication; and
    causing the indication to be displayed on the electronic display.

12. The method of claim 11, further comprising:
using the threat level to confirm or invalidate a previously existing threat level indication.

13. The method of claim 11, wherein the movement vector comprises position, and closing velocity data of the obstacle relative to the aircraft.

14. The method of claim 11, wherein the movement vector comprises absolute position, direction, and speed of the obstacle.

15. The method of claim 11, wherein the obstacle is at least one of another aircraft, a ground vehicle, and an airport structure.

16. The method of claim 15, further comprising:
using the movement vector to determine whether the obstacle is stationary, taxiing, taking off, or landing.

17. The method of claim 11, wherein determining the threat level of the obstacle to the aircraft comprises determining whether or not the obstacle is predicted to or does incur with the aircraft on a runway.

18. The method of claim 11, wherein the threat level represents at least one of a low threat level, a medium threat level, and a high threat level, the indication being changed based on the low, medium, or high threat level.

19. The method of claim 18, wherein the low threat level represents proximity but not predicted incursion, the medium threat level represents possible incursion but not immediately or directly affecting the aircraft, and the high threat level represents a predicted or actual incursion having a direct or immediate affect on the aircraft.

20. An apparatus for displaying an indication of a threat level presented by an obstacle to an aircraft on an electronic display, comprising:
means for receiving radar returns from a radar sweep by a weather radar system;
means for determining a movement vector of the obstacle using the radar returns;
means for determining the threat level of the obstacle to the aircraft based at least in part on an acceleration associated with the determined movement vector;
means for using the determined threat level to generate parameters for the indication; and
means for causing the indication to be displayed on the electronic display.

* * * * *